(12) United States Patent
Kalluri et al.

(10) Patent No.: US 12,304,318 B2
(45) Date of Patent: May 20, 2025

(54) MOTOR SPEED MEASUREMENT SYSTEMS

(71) Applicant: Hamilton Sundstrand Corporation, Charlotte, NC (US)

(72) Inventors: Nageswara Rao Kalluri, Bangalore (IN); Pravinsharma Kaliyannan Eswaran, Bangalore (IN); Sridhar Katakam, Bangalore (IN); Surendra Somasekhar Valleru, Bangalore (IN); Ashish Vijay, Bikaner (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 374 days.

(21) Appl. No.: 17/885,161

(22) Filed: Aug. 10, 2022

(65) Prior Publication Data

US 2023/0063593 A1  Mar. 2, 2023

(30) Foreign Application Priority Data

Aug. 26, 2021 (IN) ............................. 202141038687

(51) Int. Cl.
*H02P 27/04* (2016.01)
*B60L 15/20* (2006.01)
*B60W 10/06* (2006.01)

(52) U.S. Cl.
CPC ............. *B60L 15/20* (2013.01); *B60W 10/06* (2013.01); *B60W 2510/0638* (2013.01)

(58) Field of Classification Search
CPC ................................ B60L 15/20; B60W 10/06
USPC ......................................................... 318/801
See application file for complete search history.

(56) References Cited

U.S. PATENT DOCUMENTS

| | | | | | |
|---|---|---|---|---|---|
| 4,876,637 | A | * | 10/1989 | Mose | .................. H02M 5/4505 363/51 |
| 5,334,923 | A | * | 8/1994 | Lorenz | ..................... H02P 21/18 318/807 |
| 7,567,047 | B2 | | 7/2009 | Rozman | |
| 7,960,938 | B2 | | 6/2011 | DeLange | |
| 2008/0115512 | A1 | | 5/2008 | Rizzo | |
| 2010/0134064 | A1 | | 6/2010 | Heikkila | |
| 2010/0256005 | A1 | * | 10/2010 | Petrik | .............. G01N 33/54393 506/18 |
| 2011/0256005 | A1 | * | 10/2011 | Takeoka | ..................... H02P 6/18 318/400.1 |
| 2013/0172507 | A1 | | 7/2013 | Ebisawa | |
| 2019/0128936 | A1 | * | 5/2019 | Brown | ................. G01R 31/002 |

FOREIGN PATENT DOCUMENTS

| | | |
|---|---|---|
| CN | 105391364 B | 1/2018 |
| CN | 109861595 A | 6/2019 |
| DE | 102014106667 A1 | 4/2015 |

OTHER PUBLICATIONS

Extended European Search Report issued by the European Patent Office, mailed on Jan. 16, 2023, in corresponding European Patent Application No. 22191658.8.

* cited by examiner

*Primary Examiner* — Erick D Glass

(57) ABSTRACT

A motor speed monitoring system can include a monitor channel having an input configured to connect to an inverter output of an inverter to receive motor command signals from the inverter, and an intelligence module configured to determine a motor speed based on the motor power signals from the inverter.

20 Claims, 2 Drawing Sheets

MOTOR SPEED MEASUREMENT SYSTEMS

CROSS-REFERENCE TO RELATED APPLICATION

This application claims the benefit of India Provisional Patent Application No. 202141038687, filed Aug. 26, 2021, the entire contents of which is being incorporated herein by reference in its entirety.

FIELD

This disclosure relates to motor speed measurement (e.g., for electric motors used on aircraft).

BACKGROUND

The traditional approach of independent motor speed measurements in safety critical actuation based applications lacks true independency due the resolver and the processing algorithm for the resolver. The same resolver and/or algorithm are used for both the monitor channel and the control channel for providing measurements thereto, and the control channel traditionally supplies the monitor channel with resolver excitation information.

Such conventional methods and systems have generally been considered satisfactory for their intended purpose. However, there is still a need in the art for improved motor speed measurement systems. The present disclosure provides a solution for this need.

SUMMARY

A motor speed monitoring system can include a monitor channel having an input configured to connect to an inverter output of an inverter to receive motor command signals from the inverter, and an intelligence module configured to determine a motor speed based on the motor power signals from the inverter.

The monitor channel can include an input module operatively connected to the input and configured to reduce the voltage of the motor power signals and/or filter the motor power signals. The input module can include a low pass RC filter configured to convert high frequency high voltage pulse width modulated (PWM) signals into lower voltage sinusoidal signals.

The monitor channel can further include a zero cross detection module operatively connected to the input module to receive the lower voltage sinusoidal signals and to output square wave signals based on the sinusoidal signals. The monitor channel can include a digital isolation module operatively connected to the zero cross detection module and configured to receive the square wave signals and output digital signals, based on the square wave signals, to the intelligence module.

In accordance with at least one aspect of this disclosure, a line replaceable unit (LRU) can include an inverter configured to output motor power signals to a motor, and a control channel configured to control the inverter to output the motor power signals. The control channel can be configured to receive resolver output from a resolver associated with the motor to control the inverter. The LRU can include a monitor channel, e.g., as disclosed herein, e.g., as described above. The monitor channel can be completely independent of the control channel such that the monitor channel does not receive any inputs from the control channel, for example.

In accordance with at least one aspect of this disclosure, a motor system can include an electric motor, a line replaceable unit (LRU) operatively connected to the electric motor and a system control module operatively connected to the monitor channel to receive the motor speed from the intelligence module for safety monitoring and/or to determine a health of the LRU and/or the motor. The LRU can be an LRU as disclosed herein, e.g., as described above. In certain embodiments, the motor system can include a resolver operatively connected to the motor and the control channel. In certain embodiments, the motor can be an aircraft system motor.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
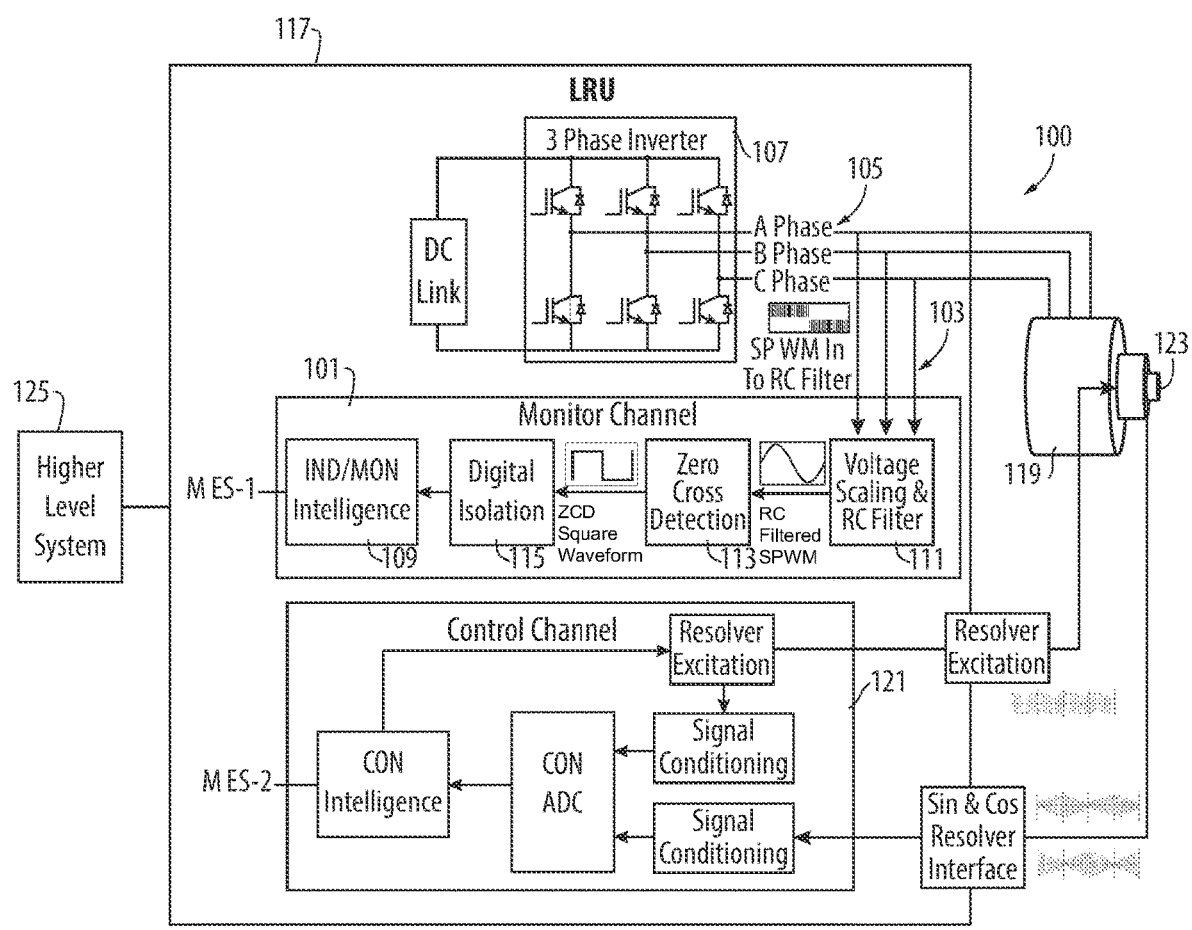
FIG. 1 is a schematic diagram of a motor system in accordance with this disclosure, having a motor speed monitoring system in accordance with the disclosure that is part of a line replaceable unit (LRU) in accordance with this disclosure.
Figure 2:
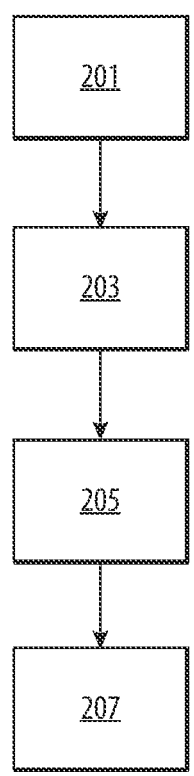
FIG. 2 is an embodiment of a method in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. Certain embodiments described herein can be used to provide truly independent motor speed measurements, e.g., for enhanced safety in critical applications.

Referring to FIG. 1, a motor speed monitoring system 100 can include a monitor channel 101 having an input 103 configured to connect to an inverter output 105 of an inverter 107 to receive motor command signals from the inverter 107, and an intelligence module 109 configured to determine a motor speed based on the motor power signals from the inverter 107. The monitor channel 101 can include an input module 111 operatively connected to the input 103 and configured to reduce the voltage of the motor power signals and/or filter the motor power signals. The input module 111 can include a low pass RC filter, for example, configured to convert high frequency, high voltage pulse width modulated (PWM) signals (e.g., output by the inverter 105) into lower voltage sinusoidal signals.

The monitor channel 101 can further include a zero cross detection module 113 operatively connected to the input module 111 to receive the lower voltage sinusoidal signals and to output square wave signals based on the sinusoidal signals. The monitor channel 101 can include a digital isolation module 115 operatively connected to the zero cross detection module 113 and configured to receive the square wave signals and output digital signals, based on the square wave signals, to the intelligence module 109. The intelligence module 109 can be configured to receive the digital signals and calculate a speed of the motor as a function of the digital signals (e.g., as a function of frequency).

Any other suitable arrangement and/or processing components within the monitor channel 101 is contemplated herein. The modules can include any suitable hardware and/or software module(s) configured to perform the associated function and/or any other suitable function. Each module can be independent or grouped together in any suitable arrangement on common hardware and/or software.

In accordance with at least one aspect of this disclosure, a line replaceable unit (LRU) 117 can include an inverter 107 configured to output motor power signals to a motor 119, and a control channel 121 configured to control the inverter 107 to output the motor power signals. The control channel 121 can be configured to receive resolver output from a resolver 123 associated with the motor 119 to control the inverter 107. The LRU 117 can include a monitor channel, e.g., monitor channel 101 as disclosed herein, e.g., as described above. As shown, the monitor channel 101 can be completely independent of the control channel 121 such that the monitor channel 101 does not receive any inputs from the control channel 121, for example.

The control channel 121 can include any suitable modules (e.g., signal conditioning, an analog to digital converter, a control intelligence module, and a resolver excitation module, e.g., as shown). For example, the control intelligence module can be operatively connected to the inverter 107 (e.g., to one or more switches thereof) to control the inverter output (e.g., the PWM signal sent to the motor 119). The control channel 121 can control the inverter 107 as a function of the resolver output (sin and cos output) to properly deliver power to the motor 119.

In accordance with at least one aspect of this disclosure, a motor system 150 can include an electric motor 119, a line replaceable unit (LRU) 117 operatively connected to the electric motor 119 and a system control module 125 operatively connected to the monitor channel 101 to receive the motor speed from the intelligence module 109 for safety monitoring and/or to determine a health of the LRU 117 (e.g., any components thereof such as the control channel 121, the monitor channel 101) and/or the motor 119 (and/or resolver 123). The LRU can be an LRU 117 as disclosed herein, e.g., as described above. In certain embodiments, the motor system 150 can include a resolver 123 operatively connected to the motor 119 and the control channel 121.

In certain embodiments, the motor 119 can be an aircraft system motor (e.g., for control surfaces, pumps, or any other suitable systems). Any suitable use (e.g., in safety critical applications) is contemplated herein.

In accordance with at least one aspect of this disclosure, referring additionally to FIG. 2, a method can include generally determining a motor speed using inverter output without using input from a control channel or motor resolver. For example, the method 200 can include receiving, at block 201, an inverter output (e.g., PWM signals), and reducing voltage and/or filtering, e.g., at block 203, the inverter output (e.g., to create a sinusoidal signal). The method 200 can also include ultimately converting the input signal, e.g., at block 205, to a square wave signal and/or to digital signal. The method 200 can also include determining, e.g., at block 207, the speed of a motor based on the square wave signals and/or digital signals. The method 200 can include any suitable method(s) and/or portions thereof.

Embodiments can use a resolver to control the motor at the motor control level. Motor speed can be used to monitor function and to ensure outputting of a requested speed is accomplished. Embodiments can use the resolver only for control and the output of inverter only for monitor to allow independent measurements. Using inverter output, the signal can be converted from higher voltage and ultimately to digital signal. Embodiments can determine speed based on the frequency of inverter output signal.

In a safety critical motor drive electronics can be an integral part of the LRU have a measurement capability of motor speed from two independent sources/channels (control and monitor) through a resolver installed in the motor. Based on the application, these motors can be of a brushless DC motor or permanent magnetic synchronous motor type. The intent of these independent measurements are both motor controlling and fault detection. To control the motor speed (and torque), accurate rotor position useful for the motor controller to drive the right commutation sequence (drive the voltage to the right phase windings). Hence the controller intelligence (in the control channel) reads the resolver signals (one excitation plus two feedbacks) and computes the rotor position. In traditional systems, this precise rotor position can help to derive the motor speed which will be used as feedback to the speed control loop and also be used as a data for fault detection once this information available at higher level system. But the other measurement, from the monitor channel, is traditionally only used to provide motor speed to the higher level system (e.g., system controller 125). The higher level system in safety critical application is authorized to read these independent speed measurements to determine the integrity of the LRU and raises a flag if any unsafe conditions are identified.

In traditional Motor drive Electronics for a DAL-A &/B type application (e.g., an application as shown) the motor has a single resolver (single excitation and two feedbacks), or single resolver with dual winding (single excitation and two sets of independent feedbacks) installed to its shaft. The resolver provides the rotor position and hence the motor speed can be derived from calculated rotor position. Since the motor speed is traditionally only sensed through resolver, both sine and cos voltage feedbacks are traditionally connected to control channel and directly or indirectly to the monitor channel. The hardware circuit design for resolver signal conditioning, analog to digital data conversion (ADC)/Resolver to Digital Conversion (RDC) and the algorithm developed using these converted feedback signals to compute the speed of the motor are the same or similar for the control channel and monitor channel. Irrespective of the type of resolver (single or dual), the resolver sensing the motor speed and the method which determines the speed, (hardware and algorithm inside the intelligent devices) from resolver sensor remains the weakest link in traditional systems which removes/reduces the intent of true independency. Traditional systems are always prone to a common mode error because the common sensing mechanism is still the resolver for both channels. Verification of these requirements or implementation are very costly to prove they are independent. Also, for a low cost system implementation, a single wound resolver (e.g., where the control channel or monitor channel drives the excitation and both sine and cosine feedbacks are connected to control channel and monitor channels for speed measurements) lacks in excitation independency. Moreover a fault at the resolver feedbacks or connection loss leads to an undetected faults (false negative) at the high level system (system controller 125) from both measurements (common mode failure). This undetected failure at the upper level system leads to an unsafe condition unless otherwise additional measurements are being added with additional cost and complexity.

Embodiments, however, provide an independent sensing motor speed mechanism from the traditional approach which removes the common mode errors in all respects (hardware and algorithms). To measure the motor speeds independently and remove design related common mode errors, a new architecture is disclosed for the monitor channel as the monitor may be required only to measure the speed of the motor unlike determining the rotor position in the control channel. In this architecture, electrical signals for monitor channel can be derived from an RC filter which is connected to the inverter output (the inverter helps in commutating the phases of motor). The RC filter smooths the high frequency, high voltage (DC bus rated) PWM pulses to sinusoidal voltage based on the RC filter cut off frequency. When the motor is driven from the inverter, this sinusoidal voltage output from the RC filter represents the electrical speed of the motor. Since the inverter output operates on high voltage and the monitor circuit operates with low voltage, there one can isolate both the low and high voltages for functional compatibility. Hence, the sinusoidal voltage output can be fed to a zero crossing detector to produce a square wave output, which is then connected to the monitor intelligence device through isolation boundary. The intelligent device then can compute the electrical speed of the motor using zero crossing of the sinusoidal waveform. The motor speed (mechanical speed) is electrical speed times a factor which is defined by number of pole pairs. The electrical speed can be computed by measuring the frequency of the square wave. If not converted into square wave before crossing the isolation boundary, it can be difficult to cross the isolation boundary with an analog waveform (sinusoidal) for a given performance, or to interface a digital converter (like an ADC) thorough a communication channel which requires more isolation channels.

With a square wave input, the intelligence module can then compute the electrical speed of the motor by measuring the frequency of the square wave (e.g., measuring the time between consecutive rising edges of the square wave). With this architecture the monitor algorithm which computes the motor speed by measuring the frequency of the square wave (which is derived from inverter output pulses) can be completely independent of resolver based algorithm (which requires different digital conversion and mathematical computations on resolver excitation and feedbacks) processed by control intelligence. This proposed architecture also removes the dependence of the excitation in the speed measurements for monitor channel.

The monitor algorithm (used by the monitor intelligence) can compute the motor speed completely independent of the resolver based algorithm (used by the control intelligence) because of different input signals. Embodiments provide a low cost solution due to removing dual wound resolver/additional resolver and interface electronics to meet the same level of independence. Certain embodiments include interface electronics comprising only passive devices (RC filter), comparator (sine to square—zero crossing detector) which are very reliable and simple devices. This approach to measure motor speed also reduces the burden on the intelligence device due to missing ADC interface, mathematical computations.

On the performance side, measuring a low frequency or high time period with the high frequency clock sources (as the intelligence module can use high clock inputs) provides greater advantages to reduce the overall measurement errors (digital counters). Mostly these motors are multi pole type motors and mechanical frequency (and also speed in RPM) is 2-3 times lower than electrical frequency. In certain applications, certain motors can be intended to operate at mechanical speeds between about 200 rpm and about 15000 rpm (about 3 Hz to about 250 Hz mechanical frequency) and their electrical speeds can be between about 12 Hz to about 1 KHz (e.g., for a 4-pole motor), about 6 Hz to about 500 Hz (e.g., for a 2-pole motor), and about 3 Hz to about 250 Hz (e.g., for one pole pair). With a 4 MHz clock input, 20 bit counter, a 2 pole or 4 pole pair motor, there may be about a 2% error at about 15000 rpm and less than 4 rpm resolution. Low speed measurement are not negatively effected using embodiments of this disclosure, and they have very good accuracy.

Embodiments can provide a truly independent speed measurements (e.g., no excitation, algorithm, hardware device, or design resource dependencies) to the higher level system, for example. Embodiments can include an overall low system cost, a design independent algorithm—simple justification for certification, single resource developing for control channel and monitor channel measurements, removal of high speed ADC devices in monitor channels for measurements (which helps in reducing the −55 deg C. ADC parts and their screening), and can prevent false negatives and provide high rate of fault/failure detection at the higher level system due to different sensing mechanisms.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A motor speed monitoring system, comprising:
   a monitor channel comprising:
      an input configured to connect to an inverter output of an inverter to receive motor power signals from the inverter; and
      an intelligence module configured to determine a motor speed based on the motor power signals from the inverter;
   wherein the inverter is configured to be controlled by inputs provided over a control channel; and wherein the monitor channel is independent of the control channel such that the monitor channel does not receive the inputs from the control channel.

2. The motor speed monitoring system of claim 1, wherein the monitor channel further comprises an input module operatively connected to the input and configured to at least one of: reduce a voltage of the motor power signals or filter the motor power signals.

3. The motor speed monitoring system of claim 2, wherein the input module includes a low-pass RC filter configured to convert high-frequency high-voltage pulse width modulated (PWM) signals into lower-voltage sinusoidal signals.

4. The motor speed monitoring system of claim 3, wherein the monitor channel further comprises a zero cross detection module operatively connected to the input module to receive the lower-voltage sinusoidal signals and to output square wave signals based on the sinusoidal signals.

5. The motor speed monitoring system of claim 4, wherein the monitor channel further comprises a digital isolation module operatively connected to the zero cross detection module and configured to receive the square wave signals and output digital signals based on the square wave signals to the intelligence module.

6. A line replaceable unit (LRU), comprising:
an inverter configured to output motor power signals to a motor;
a control channel configured to control the inverter to output the motor power signals, the control channel configured to receive resolver output from a resolver associated with the motor to control the inverter; and
a monitor channel comprising:
an input configured to connect to an inverter output of the inverter to receive the motor power signals from the inverter; and
an intelligence module configured to determine a motor speed based on the motor power signals from the inverter.

7. The LRU of claim 6, wherein the monitor channel further comprises an input module operatively connected to the input and configured to at least one of: reduce a voltage of the motor power signals or filter the motor power signals.

8. The LRU of claim 7, wherein the input module includes a low-pass RC filter configured to convert high-frequency high-voltage pulse width modulated (PWM) signals into lower-voltage sinusoidal signals.

9. The LRU of claim 8, wherein the monitor channel further comprises a zero cross detection module operatively connected to the input module to receive the lower-voltage sinusoidal signals and to output square wave signals based on the sinusoidal signals.

10. The LRU of claim 9, wherein the monitor channel further comprises a digital isolation module operatively connected to the zero cross detection module and configured to receive the square wave signals and output digital signals based on the square wave signals to the intelligence module.

11. The LRU of claim 6, wherein the monitor channel is completely independent of the control channel such that the monitor channel does not receive any inputs from the control channel.

12. A motor system, comprising:
an electric motor;
a line replaceable unit (LRU) operatively connected to the electric motor, the LRU comprising:
an inverter configured to output motor power signals to the electric motor;
a control channel configured to control the inverter to output the motor power signals, the control channel configured to receive resolver output from a resolver associated with the electric motor to control the inverter; and
a monitor channel comprising:
an input configured to connect to an inverter output of the inverter to receive the motor power signals from the inverter; and
an intelligence module configured to determine a motor speed based on the motor power signals from the inverter; and
a system control module operatively connected to the monitor channel to receive the motor speed from the intelligence module for at least one of: safety monitoring, determining a health of the LRU, or determining a health of the electric motor.

13. The motor system of claim 12, wherein the monitor channel further comprises an input module operatively connected to the input and configured to at least one of: reduce a voltage of the motor power signals or filter the motor power signals.

14. The motor system of claim 13, wherein the input module includes a low-pass RC filter configured to convert high-frequency high-voltage pulse width modulated (PWM) signals into lower-voltage sinusoidal signals.

15. The motor system of claim 14, wherein the monitor channel further comprises a zero cross detection module operatively connected to the input module to receive the lower-voltage sinusoidal signals and to output square wave signals based on the sinusoidal signals.

16. The motor system of claim 15, wherein the monitor channel further comprises a digital isolation module operatively connected to the zero cross detection module and configured to receive the square wave signals and output digital signals based on the square wave signals to the intelligence module.

17. The motor system of claim 16, wherein the monitor channel is completely independent of the control channel such that the monitor channel does not receive any inputs from the control channel.

18. The motor system of claim 17, further comprising the resolver, the resolver operatively connected to the electric motor and the control channel.

19. The motor system of claim 18, wherein the motor is an aircraft system motor.

20. The LRU of claim 6, further comprising the resolver, the resolver operatively connected to the motor and the control channel.

* * * * *